(12) United States Patent
Colegate et al.

(10) Patent No.: US 11,392,921 B2
(45) Date of Patent: Jul. 19, 2022

(54) AUTHENTICATING BASED ON A DEVICE IDENTIFIER

(71) Applicant: American Express Travel Related Services Company, Inc., New York, NY (US)

(72) Inventors: Joanna Colegate, Bognor Regis (GB); Charlie Craven, London (GB); Christopher Adrian Kong, Brighton (GB); Jonathan Lupton, Littlehampton (GB); James H. Marsden, East Sussex (GB)

(73) Assignee: American Express Travel Related Services Company, Inc., New York, NY (US)

(*) Notice: Subject to any disclaimer, the term of this patent is extended or adjusted under 35 U.S.C. 154(b) by 4 days.

(21) Appl. No.: 16/921,324

(22) Filed: Jul. 6, 2020

(65) Prior Publication Data
US 2020/0334659 A1   Oct. 22, 2020

Related U.S. Application Data

(63) Continuation of application No. 16/382,628, filed on Apr. 12, 2019, now Pat. No. 10,706,404, which is a (Continued)

(51) Int. Cl.
*H04W 12/08* (2021.01)
*G06Q 20/32* (2012.01)
(Continued)

(52) U.S. Cl.
CPC ......... *G06Q 20/3223* (2013.01); *G06F 21/31* (2013.01); *G06F 21/44* (2013.01);
(Continued)

(58) Field of Classification Search
CPC ............. G06Q 20/3223; G06Q 20/382; G06Q 20/4014; G06Q 20/4016; G06F 21/31; G06F 21/44; G06F 21/73; H04L 63/06; H04L 63/061; H04L 63/08; H04L 2463/082; H04W 12/06; H04W 12/04; H04W 12/08; H04W 12/12; H04W 12/041; H04W 12/069; H04W 12/122; H04W 12/0431
See application file for complete search history.

(56) References Cited

U.S. PATENT DOCUMENTS

2005/0144144 A1   6/2005   Graff
2007/0213050 A1   9/2007   Jiang
(Continued)

FOREIGN PATENT DOCUMENTS

EP   2343863   7/2011

*Primary Examiner* — Chuong A Ngo
(74) *Attorney, Agent, or Firm* — Thomas | Horstemeyer, LLP (57) ABSTRACT

A system and method are disclosed herein leveraging financial networks standards with mobile device data and secure processing and storage environment knowledge to authenticate a device. For instance, a party to a transaction may utilize these elements of information, not traditionally associated with wireless transactions, to achieve a lower probability of fraud and/or a higher confidence associated with the transaction.

20 Claims, 2 Drawing Sheets

Related U.S. Application Data continuation of application No. 15/614,883, filed on Jun. 6, 2017, now Pat. No. 10,304,044, which is a continuation-in-part of application No. 14/784,502, filed as application No. PCT/US2013/044221 on Jan. 5, 2013, now Pat. No. 9,681,305.

(51) Int. Cl.

| | |
|---|---|
| *G06Q 20/40* | (2012.01) |
| *G06F 21/44* | (2013.01) |
| *G06F 21/73* | (2013.01) |
| *G06Q 20/38* | (2012.01) |
| *H04L 9/40* | (2022.01) |
| *H04W 12/04* | (2021.01) |
| *H04W 12/06* | (2021.01) |
| *H04W 12/12* | (2021.01) |
| *H04W 12/041* | (2021.01) |
| *H04W 12/069* | (2021.01) |
| *H04W 12/122* | (2021.01) |
| *H04W 12/0431* | (2021.01) |
| *G06F 21/31* | (2013.01) |

(52) U.S. Cl.
CPC ........... *G06F 21/73* (2013.01); *G06Q 20/382* (2013.01); *G06Q 20/4014* (2013.01); *G06Q 20/4016* (2013.01); *H04L 63/06* (2013.01); *H04L 63/061* (2013.01); *H04L 63/08* (2013.01); *H04W 12/04* (2013.01); *H04W 12/041* (2021.01); *H04W 12/0431* (2021.01); *H04W 12/06* (2013.01); *H04W 12/069* (2021.01); *H04W 12/08* (2013.01); *H04W 12/12* (2013.01); *H04W 12/122* (2021.01); *H04L 2463/082* (2013.01)

(56) References Cited

U.S. PATENT DOCUMENTS

| | | |
|---|---|---|
| 2010/0211499 A1 | 8/2010 | Zanzot et al. |
| 2010/0332829 A1 | 12/2010 | Baroffio |
| 2012/0072350 A1 | 3/2012 | Goldthwaite et al. |
| 2012/0203663 A1 | 8/2012 | Sinclair et al. |
| 2017/0188232 A1* | 6/2017 | Raleigh ................ H04L 63/083 |

* cited by examiner

AUTHENTICATING BASED ON A DEVICE IDENTIFIER

CROSS-REFERENCE TO RELATED APPLICATIONS

This application is a continuation of, claims priority to and the benefit of, U.S. Ser. No. 16/382,628 filed Apr. 12, 2019 and entitled "AUTHENTICATING BASED ON A HARDWARE IDENTIFIER." The '628 application is a continuation of, claims priority to and the benefit of U.S. Ser. No. 15/614,883 filed Jun. 6, 2017 and entitled "MULTI-FACTOR MOBILE USER AUTHENTICATION," which issued as U.S. Pat. No. 10,304,044 on May 28, 2019. The '883 application is a continuation-in-part of, claims priority to and the benefit of, U.S. Pat. No. 9,681,305 which issued Jun. 13, 2017 (aka U.S. Ser. No. 14/784,502 filed on Oct. 14, 2015) and entitled, "SYSTEM AND METHOD FOR MULTI-FACTOR MOBILE USER AUTHENTICATION." The '502 application is a U.S. national phase filing under 35 U.S.C. § 371 of PCT/US2013/044221 filed on Jun. 5, 2013 and entitled "SYSTEM AND METHOD FOR MULTI-FACTOR MOBILE USER AUTHENTICATION." All of which are incorporated herein by reference in their entirety for all purposes.

FIELD

This disclosure generally relates to security associated with financial transactions.

BACKGROUND

Historically, in a typical credit card transaction, the process begins with a credit card holder providing his credit card to an attendant located at a point-of-sale device (e.g., cash register) within a merchant setting. In response, the attendant typically "swipes," "dips," or "waves" the card depending on the card reader that is coupled to the point-of-sale device. Thus, cardholder information (including the name of the cardholder and the credit card number) is transferred from the storage medium on the card to the point-of-sale device.

Traditional card payments via merchant Point of Sale terminals are an accepted mode of transferring value. These are generally considered to be secure by the payment processors. Also, traditional card payments via merchant Point of Sale terminals enable a merchant to shift some liability for the transaction to the transaction processor. Other payment methods (outside of a user physically interacting with a point of sale system) change the paradigm from an authorization, fraud and/or security standpoint. Oftentimes, higher premiums are leveraged on merchants accepting payments through these non-traditional payment methods as there is a higher risk associated with the transaction from the account issuer point of view.

It would be beneficial to have a system where non-traditional payment systems and methods may be employed and still maintain a low fraud risk associated with the transaction.

SUMMARY

The present disclosure relates to security associated with transactions that addresses, among other things, the aforementioned deficiencies in prior systems. Described herein is a system and method for reducing fraud risk.

According to various embodiments, a unique mobile device hardware identifier of a mobile device may be provided to a registry and/or a registry host. A unique identifier for the secure processing and storage environment of the mobile device may also be provided to the registry and/or registry host. The registry host may associate a mobile device user identifier with transaction account information of a mobile device user, the unique identifier for the secure processing and storage environment of the mobile device, and the mobile device hardware identifier in an electronic registry.

According to various embodiments, a transaction request may be transmitted from/via the mobile device over a mobile network to a trusted certificate authority for verification of a public key associated with the mobile transaction request. The trusted certificate authority may be hosted by the MNO, Registry, Transaction Processor and/or Issuer/Acquirer of the transaction accounts. The device hardware identifier information of the mobile device transmitting the mobile transaction request may be captured and/or intercepted by the MNO. The unique identifier for the secure processing and storage environment information associated with the mobile device transmitting the mobile transaction request may be captured and/or intercepted by the MNO.

According to various embodiments, the intercepted device hardware identifier information and the unique identifier for the secure processing and storage environment may be provided to the registry host for verification. The registry host may associate the mobile device hardware identifier information intercepted with the transmitted transaction request message and determine if the results are associated with the expected mobile device hardware identifier information stored in the electronic registry associated with the mobile device. Similarly, the intercepted device hardware identifier information and the unique identifier for the secure processing and storage environment may be provided to the registry host for verification. For instance, the registry host may associate the mobile device hardware identifier information intercepted with the transmitted transaction request message and determine if the expected mobile device hardware identifier information stored in the electronic registry associated with the mobile device and the unique identifier for the secure processing and storage environment information intercepted with the transmitted transaction request message are associated with an expected unique identifier for the secure processing and storage environment information stored in the electronic registry associated with the mobile device.

According to various embodiments, a mobile device user identifier may be associated with transaction account information of the mobile device user, a unique identifier for the secure processing and storage environment of a mobile device, and a unique mobile device hardware identifier in an electronic registry by a fraud prevention computer system. Public key data may be transmitted to a secure processing and storage environment of the mobile device. The public key data may be pre-provisioned to the secure processing and storage environment.

According to various embodiments, private key data may be transmitted to the secure processing and storage environment. The public key data may be securely stored to the secure processing and storage environment. A transaction request message may be transmitted over a mobile network via a transaction application stored to a memory associated with the mobile device. The private key data may be appended to the transaction request message to create a signed message. The public key data is appended to the signed message by the transaction application.

Aspects of the system may verify that the public key is correct. Aspects of the system may validate the mobile device hardware identifier captured with the transaction request message against expected mobile device hardware identifier information stored in the electronic registry and associated with the received public key.

Aspects of the system may validate the unique identifier for the secure processing and storage environment information captured with the transaction request message against an expected unique identifier for the secure processing and storage environment information stored in the electronic registry and associated with the received public key. Aspects of the system may verify that the private key data is correct. If multiple factors are correct, transaction account information may be appended to and/or transmitted with the transaction request message. The appended transaction request may be transmitted to a processor for authorization.

These features and other advantages of the system and method, as well as the structure and operation of various exemplary embodiments of the system and method, are described below.

BRIEF DESCRIPTION OF THE DRAWINGS

The accompanying drawings, wherein like numerals depict like elements, illustrate exemplary embodiments of the present disclosure, and together with the description, serve to explain the principles of the invention. In the drawings.

DETAILED DESCRIPTION

The detailed description of exemplary embodiments of the disclosure described herein makes reference to the accompanying drawings, which show the exemplary embodiment by way of illustration and its best mode. While these exemplary embodiments are described in sufficient detail to enable those skilled in the art to practice the invention, it should be understood that other embodiments can be realized and that logical and mechanical changes can be made without departing from the spirit and scope of the disclosure. Thus, the detailed description herein is presented for purposes of illustration only and not of limitation. For example, the steps recited in any of the method or process descriptions can be executed in any order and are not limited to the order presented.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections are present in a practical system.

With the introduction of mobile payment systems using the Global System for Mobile Communication (GSM) band, distributed Internet and/or proximity radio frequency payment methods, the paradigm of defining whether a "transaction instrument," such as a transaction card, or "authorized card holder" is present during a transaction is blurred. In these new authentication scenarios, in accordance with exemplary embodiments described herein, information associated with a secure processing and storage environment 260 combined with a mobile device can be used as a payment authentication system and method. However, merchants adopting these new transaction solutions may be charged a pricing rate for a "Card Not Present" transaction based on the traditional risk model that payments taken over the internet have a higher potential fraud and the merchant is unable to use normal, Transaction instrument, signature, personal identification number (PIN) and/or in-person government issued identification presentment, cardholder verification methods. Although the chip used for Payment Cards (embedded within the transaction instrument) and SIM cards are functionally the same and at times electronically indistinguishable, the mobile device is not classified as secure enough for normal PIN entry user authentication according to some standards, such as Payment Cards Industry (PCI)—Pin Transaction Security (PTS) Pin Entry Device (PED) standards. Therefore, another non-tamper, method may be implemented to validate that the mobile device is authentic and verifiable for use. Various embodiments of that method are described herein.

According to various embodiments, the Integrated Circuit Card (ICC) of the SIM card is made to the same ISO Standards for both a Financial Card security instrument and for Mobile Network SIM card security device and may be configured to hold multiple credentials (depending on the Chip memory capacity).

Mobile networks may use the International Mobile Station Equipment Identity (IMEI) 135 to verify that the mobile handset in use is authentic. Also, in the case of stolen/lost handsets, the IMEI 135 may be used to prevent unauthorized future use, by restricting the IMEI 135 from further use until otherwise directed. The IMEI 135 is a code, normally a number, usually unique, to identify 3rd Generation Partnership Project, (3GPP) (i.e., GSM, UMTS, LTE) and/or Integrated Digital Enhanced Network (iDEN) mobile devices as well as some satellite phones. It is usually found printed inside the battery compartment of the phone, but can also be displayed on-screen on most phones by entering a code in the dial pad, such as *#06#, or alongside other system 100 information in the settings menu on various operating systems. The IMEI 135 has not been associated with financial transactions and/or the security of financial transactions previously.

The International Mobile Subscriber Identity (IMSI) is a unique identification associated with all cellular networks. It may be stored as a code, such as a 64 bit field, and may be sent by a mobile device to a network. The IMSI may also be used for acquiring other details of the mobile device in the home location register (HLR) or as locally copied in the visitor location register. According to various embodiments, an IMSI may be used as an international identifier on a SIM card for correct account billing (particularly in international roaming) and also again in the case of "restricting" use for stolen/lost or decommissioned accounts.

According to various embodiments, financial networks standards may be leveraged with mobile device data and secure processing and storage environment 260 knowledge to authenticate a device. For instance a party to a transaction, such as a third party to a transaction, may utilize these elements of information, not traditionally associated with wireless transactions, to achieve a lower probability of fraud and/or a higher confidence associated with the transaction.

In various embodiments, a payment via a mobile device may be initiated by the user of the transaction mobile device via their own device. In this way, the Merchant or Recipient details are located and/or entered by the user and used to complete the transaction request 360. These details may be entered into a user application or user menu on the mobile device. This may be referred to as a "Pushed" transaction," "Push Authorization" and/or "Push Funds." The responsibility for the handling of the transaction rests with the mobile device User rather than the Merchant, who, in general, receives a receipt of successful transactions and may reverse the transaction if the details are incorrect. Compared to some techniques, repudiation may be more difficult given the Customer/User responsibility on their own device. According to various embodiments, Pulled transactions where the responsibility for the handling of the transaction rests with the Merchant are also contemplated herein.

As previously mentioned, in some near field communication (NFC) payments via some NFC transaction instruments, the "Card Present" rate is applied to the users. However, mobile device payments made utilizing NFC technology are beholden to strictly controlled certification processes with agreed suppliers to allow the "Card Present" policy. Aspects of the present disclosure are intended to increase reliability of transactions, decrease fraud opportunities, and achieve wider adoption of "card present" status to mobile device generated transactions.

The primary difference between a contactless enabled transaction instrument, such as a transaction card, and a contactless enabled mobile device is that one is accessing an ICC of the contactless enabled transaction instrument while the other is accessing an ICC of a secure processing and storage environment 260 of the mobile device made to the same specifications. According to various embodiments, the present description may alleviate some of the concerns with this discrepancy and lead to wider adoption of new technologies.

According to various embodiments, through collaboration between Issuers and Mobile Network Operators, (MNO) 250 payment schemes and techniques leveraging previously ignored technical data may be utilized to approve/authorize transactions. Previously MNOs or Mobile Virtual Network Operators (MVNOs) 250 have not had or contemplated use of the Financial Regulation standards and/or Financial Networks have not had access to mobile call logging data (including IMSI, IMEI 135 data), such as substantially real-time mobile call logging data. Those that license mobile devices and their use may be a MVNO 250 and/or a MNO 250. The model disclosed herein combines several standards from the SIM card, Device, Financial Network specifications and a new proprietary "Tokenization" system and registry 220 based on the knowledge of these standards.

According to various embodiments, mobile devices are allocated a unique identifying number, such as an IMEI 135 number. At times, this IMEI 135 number may be used to reduce counterfeit mobile devices. Lost or stolen mobile devices may be flagged in a registry 220 and/or decommissioned by a Mobile Network Operator 250. Thus, an IMEI 135 number may be matched to a registry 220 to determine if the mobile device is commissioned or decommissioned. IMEIs 135 are device specific codes. Each device of a manufacture has its own specific IMEI 135 code.

The MVNO 250 and/or a MNO 250 may license a brand, via a secure processing and storage environment 260, and lease the service and the mobile device bandwidth of a company. Each secure processing and storage environment 260 has unique identifier for the secure processing and storage environment 145, such as a number, (e.g. an IMSI for a SIM card). Similarly, traditionally each transaction instrument has a transaction instrument specific EMB code.

For a traditional mobile device operating on a mobile network, a secure processing and storage environment 260 is issued to each mobile device for consumption of data over the network, such as for telephone communications. In cases where the secure processing and storage environment 260 is a SIM card, an international subscriber number is issued individually for a network and to a specific individual. Generally, associated with this number is a country designation, a network is identified, and details of the user are inscribed, i.e., stored on each SIM card. This stored information is generally static. Stated another way, the unique identifier 145 for the secure processing and storage environment 260, which is generally static, identifies the secure processing and storage environment 260. Additional identification and information may be associated with the secure processing and storage environment 260, individual, and network, such as a MSISDN 140, TMSI and/or an ICCID. A MSISDN 140 is a number uniquely identifying a subscription to a mobile network. An ICCID or Integrated Circuit Card Identifier may identify each secure processing and storage environment 260 internationally. A Temporary Mobile Subscriber Identity (TMSI) is randomly assigned by a visitor location register to every mobile device in the area, in response to the mobile device being switched on. Optionally, any of these identifiers may be used for validation and/or verification processes.

ICCIDs, TMSI and/or MSISDN 140 may be temporary, nonstatic designators. For instance, these identifiers may be assigned and/or switched when a user moves from a first country to a second country, and/or participates in international roaming. Thus, a different TMSI identified or MSISDN 140 may be associated with the mobile device depending on where a user is located. However, the unique identifier 145 for the secure processing and storage environment 260 is static, non-changing, as the unique identifier 145 for the secure processing and storage environment 260, in the case of an IMSI, may be the designator that is used to bill an individual for use of bandwidth regardless of device used to consume the bandwidth.

Thus, the MSISDN 140 may be assigned, and an IMEI 135 designating a mobile device and the unique identifier 145 for the secure processing and storage environment 260, are generally static information designators. Thus, each mobile device comprises two static pieces of information for an MVNO 250 to register to a database and/or registry 220. These two static designators, the IMEI 135 and the unique identifier 145 for the secure processing and storage environment 260 may be linked to a third designator. The third designator may be a user, a transaction account, an expected location, a mobile application specific code and/or the like.

Figure 1:
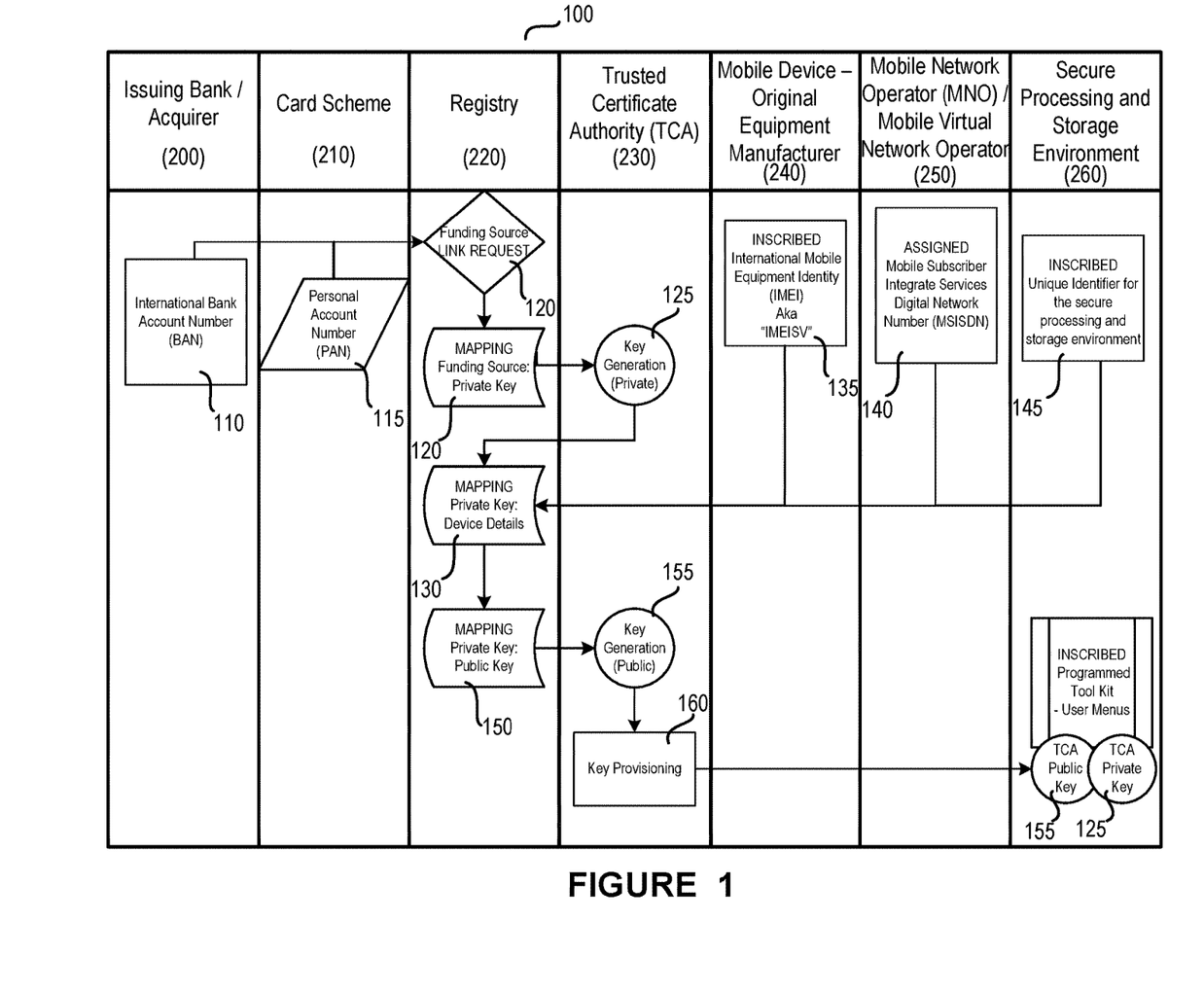
FIG. 1 illustrates an exemplary registration and identification mapping process in accordance with various embodiments.

With reference to FIG. 1, and in accordance with various embodiments, a BAN 110, which may be an international bank account number, which may be a 16-digit code, may identify a country of origin, identify a bank of origin and/or designate a user's personal transaction account number. The BAN 110 may identify an issuer 200 of transaction accounts and/or acquirer 200 of transaction accounts. The BAN 110 may be used for payments or bank to bank transfers, and/or the like. In a traditional transaction account scheme 210, a personal account number 115, (PAN 115) may be embossed into a physical transaction instrument, such as a transaction card. A PAN 115 may be used for web payments, paper bills, and the like. The PAN 115 may be a way for point of sale terminal transactions to track data. Both the PAN 115 and the BAN 110 may identify a funding source, such as a credit funding source or debit funding source, and can be used in an ISO message and associated with a transaction on a financial network. Traditionally, embossing this number on a physical instrument introduces communication difficulties and security risks.

Historically, short message service (SMS), unstructured supplementary services data (USSD) and lower bands of communication methods have not been well suited for financial transaction messages, either because of the memory and the length of the message or because the network is a public network and security of data cannot be ensured. According to various embodiments, to address this concern, a registry 220 is created linking the unique identifier 145 for the secure processing and storage environment 260 and the IMEI 135 number. Stated another way, a user having a mobile device, the unique identifier 145 for the secure processing and storage environment 260, and a secure processing and storage environment 260 may be able to conduct secure transactions via the mobile device. Thus, a relationship between the issuer 200 and the MNO 250 and/or MVNO 250 is created to facilitate financial transactions where none existed or was envisioned before. This relationship may enable secure transmission of information. In this way, fraud mitigation may be achieved. Based on this relationship and the security it provides, in some cases liability may be shifted from a merchant to a payment processor. Also, the cost of doing business may be decreased to the merchant as the higher premium for a "card not present" transaction may be removed. As stated above, the MNO 250 and/or MVNO 250 may issue a secure processing and storage environment 260 associated with the mobile device. Thus, the MNO 250 and/or MVNO 250 have the unique identifier 145 for the secure processing and storage environment 260 in their system 100. The MNO 250 and/or the mobile device user may register their IMEI 135 number in a registry 220. This may be via a mobile application downloaded to the mobile device. For instance, the mobile application may pull an IMEI 135 code from an operating system of the device. Also, by dialing *#06#, the mobile device may display its IMEI 135. Generally, the unique identifier 145 for the secure processing and storage environment 260 is held private by the MVNO 250 and/or MNO 250.

According to various embodiments, the unique identifier 145 for the secure processing and storage environment 260 may be linked to the IMEI 135 number and a funding source that an individual/user wants to pay from. This may be accomplished via a funding source link request 120. A registry 220 may encrypt and store the funding source information. A stand-in token linked to the funding source information may be stored on the secure processing and storage environment 260.

For instance, according to various embodiments, a user and/or a MNO 250 may provide to a registry 220 provider/host an IMEI 135 number. According to various embodiments, a user may also provide an IMEI 135 number to the registry 220 provider/host. The user may present a valid ID, such as a government issued ID at this time. This may be linked to and/or associated with an issued and/or to be issued secure processing and storage environment 260. A confirmation, of identity, such as through a valid ID may be made at this time. A user transaction account may be linked to the provided values in a registry 220. A private key 125 may be generated by a trusted certificate authority 230 to facilitate an exchange of information. The private key 125 may be mapped 130 to the IMEI 135, MSISDN 140, and/or the unique identifier 145 for the secure processing and storage environment 260. A trusted certificate authority 230 may generate a public key 155 which, along with private key 125 data, allows access to communication session over a network. This private key and/or public-key/private-key pair may be provisioned 160 to a secure processing and storage environment 260 on the mobile device 240. In various embodiments, any portion of this data may be stored in a secure location of the secure processing and storage environment 260. The secure processing and storage environment 260 may be pre-provisioned to accept any portion of this data.

Various forms of secure processing and storage environments 260 may be utilized. In various embodiments, the secure processing and storage environment 260 may be a SIM card, an embedded secure element, a trusted execution environment, and/or white box cryptography. An embedded secure element may be similar in functionality to a SIM card, but the embedded secure element may be embedded into the mobile device itself, and thus, may be independent of the SIM card that is inserted into the mobile device 240. The secure processing and storage environment 260 may be a dedicated chip, which may be a component on the motherboard, but could be attached in other ways. The secure processing and storage environment 260 may be embedded in the device during manufacture of the device, such that the secure processing and storage environment 260 is not removable. Embedded secure elements may be utilized in some mobile devices such as iPhones® and used to implement mobile payment systems such as ApplePay®. A trusted execution environment may be a secure operating mode of a CPU, typically deployed in some mobile devices. In various embodiments, the secure mode may only execute trusted (cryptographically signed) applications and may have access to certain areas of memory that are inaccessible outside of the secure mode. As opposed to being a separate chip, a trusted execution environment may be a secure operating mode of the main CPU of the mobile device 240. The trusted execution environment may be used in some mobile devices such as Samsung® phones and used to implement mobile payment systems such as Samsung Pay®. White box cryptography may be a software security implementation that runs in software and is therefore independent of the hardware of the mobile device 240, such as WhiteBox Software Protection, provided by INSIDESECURE®.

As used herein, public-key/private-key cryptography may refer to a cryptographic system 100 utilizing two separate keys, one of which is secret and one of which is public. Although different, the two parts of the key pair are linked. One key locks or encrypts the plaintext, and the other unlocks or decrypts the ciphertext, and/or encoded information. Neither key can perform both functions by itself. Thus, the public key 155 may be published without compromising security, while the private key 125 is generally not revealed to the unauthorized.

According to various embodiments a digital signature may be associated with communications described herein. In response to data being signed by a private key 125, the corresponding public key 155 is bound to the signed data. Stated another way, only the corresponding public key 155 can be used to verify the signature and ensure that the data has not been modified. A public key 155 can be protected from tampering by using its corresponding private master key to sign the public key 155 components and user IDs, thus binding the components to the public master key. Signing public key 155 components with the corresponding private master signing key may be referred to as selfsigning, and a public key 155 that has self-signed user IDs bound to it is called a certificate.

As disclosed herein, a secure mutual authentication process is described in terms of encrypting and/or decrypting security keys. However, the present disclosure contemplates authentication by way of encrypting and decrypting any type of security protocol. For example, the present disclosure contemplates the use of digital signatures, digital certificates, GPS information, identifier information, and the like.

Figure 2:
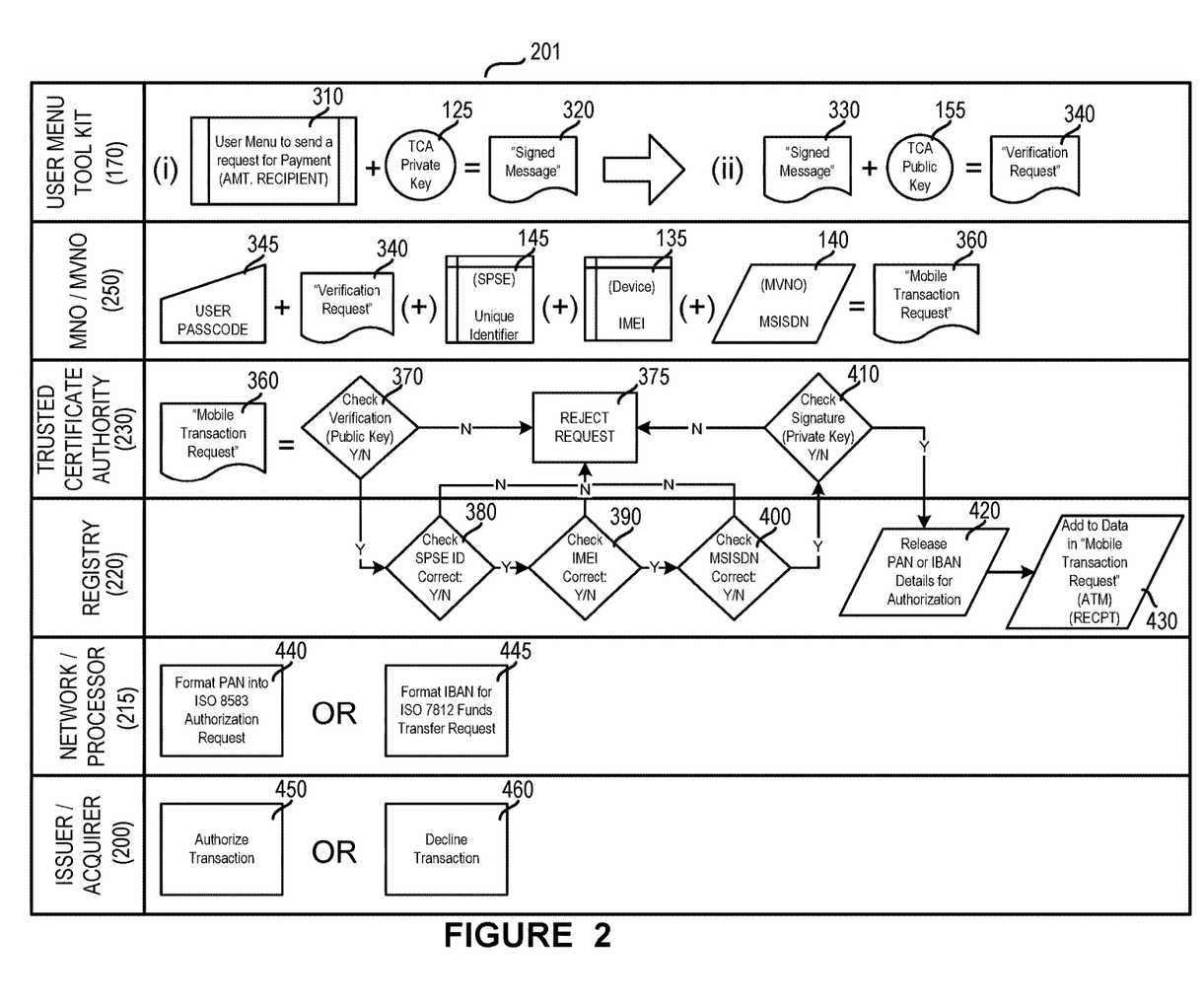
FIG. 2 illustrates an exemplary multistep validation process in accordance with various embodiments.

For instance, and with reference to FIG. 2 and flow diagram 201, the private key 125 may be linked to a user menu 170 (of the mobile device) for requesting payment 310, such as a user generated request for payment, to create a signed message 320.

Through use of the public key 155 upon reading the signed message 320, a session may be initiated and a verification request 340 may be issued. Optionally, a user passcode 345 may be provided by the user and transmitted with the verification request 340 as an additional fraud prevention technique. This user passcode 345 may be a code of determined length established by the user that may be easily remembered by the user. This user passcode 345 may be pre-stored by the registry 220 host.

The MNO/MVNO 250 may be instructed to push and store this information to the user's specific mobile device address. Thus the MSISDN 140, is configured to reside in an EMV approved secured area on the secure processing and storage environment 260, such as a secure portion of the ICC of the SIM card. EMV is a global standard for inter-operation of integrated circuit cards and integrated circuit card capable point of sale (POS) terminals and automated teller machines (ATMs), for authenticating credit and debit card transactions. According to various embodiments, the MSISDN 140 may be used to contact a user mobile device and push the private keys and public keys into a storage area of the secure processing and storage environment 260, such as a secure storage area of the SIM card. Thus, in response to registration of a user with the system 100, generation of the public 155 and private keys 125, the user may be uniquely identified and authorized by the system 100.

As previously described, the secure processing and storage environment 260 may be issued to the user and/or mobile device 240 with a holding block ready to receive this information. Embedded secure elements may be issued inside the mobile device 240 at the time of purchase. SIM cards may be issued either with the mobile device 240 or when the user switches networks. For instance, the SIM card may be pre-provisioned to receive and store a key pair for requesting transactions.

In operation, in response to registration and a user setting up their identification information, the user is ready to transmit payments via their mobile device. Thus, a user may elect to perform a transaction. A transaction request 360 may be associated with this transaction. Using a mobile device pre-stored menu (e.g., a menu of a mobile application), merchant identification data (e.g., a merchant specific number) may be entered into and/or provided to the application. Merchant information may be displayed via the mobile device to identify and verify the correct parties are present. For instance, the merchant address, name, and other distinguishing information may be presented via the mobile application on the mobile device. The user may agree with this validation prior to proceeding.

The private key 125 information may be linked to the transaction request 360 and create a signed message 320. This message may contain transaction information, such as information describing the amount of value desired to transmit, the parties and/or the like. As previously described, using the public key 155, the signed message 320 may be decrypted to uncover the details of the verification request 340.

The public key 155 may be initially transmitted from a mobile device and verified by a trusted certificate authority 230. Later, the additional details of the mobile transaction request 360 may be transmitted from the mobile device and verified by the trusted certificate authority 230. Of course, according to various embodiments, a single message comprising the public key 155 and the details of the mobile transaction request 360 may be transmitted from the mobile device via an application and verified by the trusted certificate authority 230.

This transmittal may optionally be in response to a user providing a validation and/or passcode. For instance, an option on the menu system of the mobile application may be to add a further user passcode 345 prior to transmitting data. This may be a static or dynamic passcode to be entered prior to the transaction request 360 being sent over the mobile network, such as the 3G network and/or iDEN network. A static passcode may refer to a passcode issued by the registry 220 host to the user. A dynamic passcode may refer to a passcode that may be elected by and/or selected by the user. The MNO 250 and/or MVNO 250 may route the transmittal of the mobile transaction request 360 over the mobile network. With this routing the unique identifier 145 for the secure processing and storage environment 260 number may be captured, such as by the MNO 250. IMSI information is commonly captured by the MNO 250 and/or MVNO 250 to bill the actual call/transfer of data itself. However, IMSI information is not captured by the MNO 250 for use in verification and fraud prevention. The MNO 250 and/or MVNO 250 may determine the IMEI 135 number to validate that the device is correct (expected). This call/transfer of data over the network may be into a registry system 220. This end point and/or destination number may be hidden from the user. A record of this call/transfer of data may be created and stored to a database.

Once connected to the verification system, the verification/public key 155 may be checked to verify that the public key 155 is correct. In response to the public key 155 being incorrect, the transaction may be halted. In response to the public key 155 being correct, the unique identifier 145 for the secure processing and storage environment 260 detail, the IMEI 135 detail, and/or optionally the MSISDN 140 information may each be individually checked against the registry 220 information.

For instance, the MVNO 250 and/or MNO 250 may exchange the details with the trusted certificate authority 230 and/or registry host 220 to identify that the device is correct. In response to the details being incorrect, the MNVO 250 and/or trusted certificate authority 230 may halt the transaction and communicate a message to be stored, indicating that the public key 155 was correct but other expected details are wrong. For instance, a message indicating that an incorrect secure processing and storage environment 260 was used or a secure processing and storage environment 260 that is not expected for use with this device or with these other details was used. For instance, if a secure processing and storage environment 260 were swapped into a different device and not updated/registered in the registry 220 the transaction would not be able to proceed.

In response to a correct public key 155 being verified/established, expected unique identifier 145 for the secure processing and storage environment 260 and IMEI 135 data being found, then the secure processing and storage environment 260 and specific mobile device is authenticated. At this time, the MSISD 140 may be reviewed to indicate that this is in fact a domestic transaction, and that the transfer of data/call is occurring in the expected geographic location.

Thus, a plurality, such as at least three points, of authentication elements and systems may be used. According to various embodiments, the first point of authentication may indicate that a valid person that has previously registered in the registry 220 is involved with the transaction request 360. The second point may be a determination that the mobile device is the expected device. The third point may be ensuring the one to one mapping is a valid mapping. In response to all of these three being correct/validated, the registry 220 system may release the BAN 110 or the PAN 115 details to a transaction account/financial transaction processor 420. These may be proxy account numbers. According to various embodiments, this financial transaction processor or their involvement is not seen by the merchant or the customer.

The payment details may be added to/appended to the transaction request 360 by the registry 220 system host, such as information identifying a source of funding and a individual associated with the source prestored in the registry 220 associated with the received authentication credentials. The original transaction request 360 may include an amount of value to transfer and to whom. The network may complete/transfer the details of the transaction to an issuer and/or acquirer 200. In response to the transaction being completed a memorialization of the authorization of the transaction may be communicated to any party to the transaction.

In this way, the registry 220 system host may act similar to the workings of a traditional point-of-sale device which may combine the cardholder information with transaction information (including total price of sale and merchant identification), and send the combined data set to an acquirer 200 or third-party processor 215. The third-party processor 215 may respond by forwarding the data set to the card association's (e.g., Visa, American Express, etc.) proprietary transaction network, whereby the data set is routed to the issuing bank. The processor 215 may format the combined data set into an ISO message if it is not already in that form.

For instance, the third-party processor 215 may format 440 the PAN message into an ISO 8583 authorization request or a BAN message into an ISO 7812 Funds transfer request 445. ISO 8583 defines a message format and a communication flow so that different systems can exchange these transaction requests and responses. The vast majority of transactions made at ATMs use ISO 8583 at some point in the communication chain, as do transactions made when a customer uses a card to make a payment in a store electronic fund transfers at a point of sale. ISO 7812 is the international standard that specifies "a numbering system for the identification of issuers of cards that require an issuer identification number (IIN) to operate in international, inter-industry and/or intra-industry interchange" and procedures for registering IINs.

Upon reception of the data set, the issuing bank checks the proposed financial transaction against a set of credit rules and either approves or denies the financial transaction. If approved, the approval is transmitted to the merchant and/or merchant computer system. Thereafter, the card-issuing bank forwards a monetary sum equal to the sale price to the merchant's bank (typically, a processor is used as an intermediary that forwards the monetary sum to the merchant's bank). At the expiration of the billing period, the cardholder pays the sales price (plus interest and finance charges) to the card-issuing bank.

A user may re-register their mobile device at any time. For instance, a user may re-register their mobile device in the case of upgrading devices or due to mobile device theft or mobile device loss.

The trusted certificate authority 230 and the registry 220 host may be the same entity. The trusted certificate authority 230 and/or the registry 220 host may be a financial institution, such as an issuer/acquirer 200 or the network/processor 215. According to various embodiments the trusted certificate authority 230 and/or the registry 220 host issuer 200 may be operated by the MNO 250 and/or MVNO 250.

The messages described here may conform to the USSD messaging protocol. For instance, each message may be limited to a 182 characters maximum. For instance, the public key 155 may be sent in a first message limited to 182 characters followed by a second message containing additional transaction information. According to various embodiments the private key 125 may be combined with additional information, such as the information which is being encrypted in a single USSD message. These messages may conform to the X509 certificate standard.

The present disclosure is described herein in terms of functional block components, screen shots, optional selections and various processing steps. Such functional blocks are realized by any number of hardware components configured to perform to specified functions. For example, the present disclosure may employ various integrated circuit components (e.g., memory elements, processing elements, logic elements, look-up tables, and the like), which may carry out a variety of functions under the control of one or more microprocessors or other control devices. Similarly, the software elements of the present disclosure can be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present disclosure may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, telephone communication networks, VOIP, NFC and/or the like.

The messages transmitted, such as the appended transaction request messages, as disclosed herein, may be transmitted via NFC protocols, such as through an RFID tag, a transponder and/or an RFID read/write device.

In accordance with another aspect of the present disclosure, an RF transaction using transponder, RFID read/write device, and/or tag (collectively "transaction devices") are secured by limiting the number of transactions which are performed with a particular transaction device. Once the maximum transactions value is reached, the transaction device may automatically disable itself against further usage.

In another exemplary embodiment, the transaction devices in accordance with the present disclosure may further include a transaction counter for recording and reporting the number of transactions performed with the particular transaction device. For a detailed explanation of a suitable counter for use with the disclosure, please refer to commonly-owned U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004, incorporated by reference in its entirety.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

References to a SIM card may be referring to a subscriber identity module or subscriber identification module (SIM). A SIM card is an integrated circuit that securely stores the international mobile subscriber identity (IMSI) and the related keys used to identify and authenticate subscribers on mobile telephony devices (such as mobile phones and computers). These keys are for use of the phone on the network and are distinct from Keys described herein for verification of identification transferred and/or associated with a transaction request.

A SIM circuit is embedded into a removable plastic card. This plastic card is called "SIM card" and can be transferred between different mobile devices. SIM cards were first made the same size as a credit card (85.60 mm×53.98 mm×0.76 mm). The development of physically smaller mobile devices prompted the development of a smaller SIM card, the mini-SIM card, micro-SIM card and/or Nano-SIM card. Mini-SIM cards have the same thickness as full-size cards, but their length and width are reduced to 25 mm×15 mm. Micro-SIM cards have the same thickness and contact arrangements as the min-SIM card, but the length and width are further reduced. The Nano-SIM card, which measures 12.3×8.8×0.67 mm and maintains the existing contact arrangements of prior form factors.

A SIM card may contains its unique serial number (IC-CID), international mobile subscriber identity (IMSI), security authentication and ciphering information, temporary information related to the local network, a list of the services the user has access to and two passwords: a personal identification number (PIN) for ordinary use and a personal unblocking code (PUK) for PIN unlocking. SIM cards are not traditionally used in financial transfers.

The phrases consumer, mobile device user, customer, user, account holder, account affiliate, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the card member may include a transaction account owner, a transaction account user, an account affiliate, a child account user, a subsidiary account user, a beneficiary of an account, a custodian of an account, and/or any other person or entity affiliated or associated with a transaction account.

As used herein, "match" or "associated with" or similar phrases may include an identical match, a partial match, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YouTube, AppleTV, Pandora, Xbox, Sony PlayStation), a uniform resource locator ("URL"), a document (e.g., a Microsoft Word document, a Microsoft Excel document, an Adobe .pdf document, etc.), an "ebook," an "emagazine," an application or microapplication (as described herein), an SMS or other type of text message, an email, Facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, Living Social®, and the like. Moreover, examples of mobile device communications include texting, email, and mobile applications for smartphones.

As used herein, "appended" or similar terms may include sent in concert with, added to, joined and/or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer systems described herein also include a main memory, such as for example random access memory (RAM), and may also include a secondary memory which may be a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, and optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app In various embodiments, with reference to the references to a mobile device application herein may take the form of application software. Application software, also known as an application or an "app," is computer software designed to help the user to perform specific tasks. This application software may be a mobile application, also called mobile app, usually designed to run on smart phones and tablet computers; however, according to various embodiments, this mobile app may be run on any computer based system. In various embodiments a mobile device user may download and install the app for via and/or on a mobile device, such as a smart phone or tablet. This app may be part of a larger application suite providing additional services or may be a stand-alone module/app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Systems and methods described herein may be useful on the African continent where payment via mobile devices is expanding.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

The computer systems discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. Web Sphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user," "mobile device user," "consumer," "customer," "card member," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device, such as a computer and/or mobile device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank/financial institution computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 1-2 the process flows depicted are merely embodiments and are not intended to limit the scope of the disclosure. For example, the steps recited in any of the method or process descriptions may be executed in any order and are not limited to the order presented.

Computer program instructions described herein may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Phrases and terms similar to an "entity" may include any individual, consumer, customer, group, business, organization, government entity, transaction account issuer or processor (e.g., credit, charge, etc.), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that are a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

The invention claimed is:

1. A method, comprising:
receiving, by a computer, a transaction request message having a mobile device identifier and requesting a transfer of an amount of value;
validating, by the computer, the mobile device identifier based at least in part on comparing the mobile device identifier with an expected mobile device identifier;
including, by the computer, transaction account information of a mobile device user in the transaction request message to create a modified transaction request message in response to the mobile device identifier being validated, the transaction account information indicating an account number as a source of funding for the amount of value; and
transmitting, by the computer, the modified transaction request message for authorization.

2. The method of claim 1, wherein including the transaction account information in the transaction request message further comprises appending the transaction account information to the transaction request message.

3. The method of claim 1, wherein the mobile device identifier comprises a mobile device hardware identifier.

4. The method of claim 1, wherein the mobile device identifier comprises a mobile device secure processing identifier.

5. The method of claim 1, further comprising associating, by the computer, the mobile device identifier with a mobile device user identifier of the mobile device user.

6. The method of claim 1, further comprising transmitting, by the computer, public key data and private key data to a mobile device, wherein the private key data and the public key data is included in the transaction request message, wherein the mobile device identifier is associated with the public key data.

7. The method of claim 1, wherein the mobile device identifier is captured by a mobile network operator.

8. The method of claim 1, further comprising validating, by the computer, mobile device location information based at least in part on comparing the mobile device location information captured from the transaction request message with expected mobile device location information.

9. The method of claim 1, further comprising providing the expected mobile device identifier to an electronic registry.

10. A system, comprising:
at least one computing device; and
instructions executable in the at least one computing device, wherein when executed the instructions cause the at least one computing device to at least:
receive a transaction request message having a mobile device identifier and requesting a transfer of an amount of value;
validate the mobile device identifier based at least in part on comparing the mobile device identifier with an expected mobile device identifier;
include transaction account information of a mobile device user in the transaction request message to create a modified transaction request message in response to the mobile device identifier being validated, the transaction account information indicating an account number as a source of funding for the amount of value; and
transmit the modified transaction request message for authorization.

11. The system of claim 10, wherein the transaction account information is appended to the transaction request message in the modified transaction request message.

12. The system of claim 10, wherein the mobile device identifier comprises an International Mobile Subscriber Identity (IMSI) code.

13. The system of claim 10, wherein the mobile device identifier comprises an International Mobile Equipment Identity (IMEI) code.

14. The system of claim 10, wherein when executed the instructions further cause the at least one computing device to at least associate the mobile device identifier with a mobile device user identifier of the mobile device user.

15. The system of claim 10, wherein when executed the instructions further cause the at least one computing device to at least transmit public key data and private key data to a mobile device, wherein the private key data and the public key data is included in the transaction request message, wherein the mobile device identifier is associated with the public key data.

16. The system of claim 10, wherein the mobile device identifier is captured by a mobile network operator.

17. A non-transitory computer-readable medium embodying a program executable in at least one computing device, wherein when executed the program causes the at least one computing device to at least:
receive a transaction request message having a mobile device identifier and requesting a transfer of an amount of value;
validate the mobile device identifier based at least in part on comparing the mobile device identifier with an expected mobile device identifier;
include transaction account information of a mobile device user in the transaction request message to create a modified transaction request message in response to the mobile device identifier being validated, the transaction account information indicating an account number as a source of funding for the amount of value; and
transmit the modified transaction request message for authorization.

18. The non-transitory computer-readable medium of claim 17, wherein the transaction account information is appended to the transaction request message in the modified transaction request message.

19. The non-transitory computer-readable medium of claim 17, wherein the mobile device identifier comprises an International Mobile Subscriber Identity (IMSI) code and an International Mobile Equipment Identity (IMEI) code.

20. The non-transitory computer-readable medium of claim 17, wherein the mobile device identifier is captured by a mobile network operator.

* * * * *